United States Patent
Akkiraju et al.

(10) Patent No.: US 11,361,355 B2
(45) Date of Patent: Jun. 14, 2022

(54) MARKETPLACE SUGGESTIONS FOR CLOUD SERVICE PROVIDERS

(71) Applicant: Kyndryl, Inc., New York, NY (US)

(72) Inventors: Rama Kalyani T. Akkiraju, Cupertino, CA (US); Arundhati Bhowmick, Santa Clara, CA (US); Bina Khimani, Sunnyvale, CA (US)

(73) Assignee: Kyndryl, Inc., New York, NY (US)

( * ) Notice: Subject to any disclaimer, the term of this patent is extended or adjusted under 35 U.S.C. 154(b) by 1309 days.

(21) Appl. No.: 14/847,377

(22) Filed: Sep. 8, 2015

(65) Prior Publication Data

US 2017/0069011 A1    Mar. 9, 2017

(51) Int. Cl.
*G06Q 30/00* (2012.01)
*G06Q 30/06* (2012.01)
*H04L 67/10* (2022.01)

(52) U.S. Cl.
CPC ..... *G06Q 30/0625* (2013.01); *G06Q 30/0641* (2013.01); *H04L 67/10* (2013.01)

(58) Field of Classification Search
CPC . G06Q 30/0625; G06Q 30/0641; H04L 67/10
USPC ................................................ 705/26.1–27.2
See application file for complete search history.

(56) References Cited

U.S. PATENT DOCUMENTS

| | | |
|---|---|---|
| 8,965,957 B2 | 2/2015 | Barros |
| 2010/0131624 A1 | 5/2010 | Ferris |
| 2011/0137805 A1 | 6/2011 | Brookbanks et al. |
| 2012/0198073 A1* | 8/2012 | Srikanth ............... G06F 9/5027 709/226 |
| 2013/0268561 A1* | 10/2013 | Christie ............... G06F 16/116 707/777 |

OTHER PUBLICATIONS

IBM; "Method of creating a componentized architecture for unifying resource sharing scenarios in Cloud Computing environment"; An IP.com Prior Art Database Technical Disclosure; Original Publication Date: Feb. 11, 2010; IP.com Electronic Publication: Feb. 11, 2010; IP.com No. 000193146; pp. 1-13.

Peng et al.; "A Network Virtualization Framework for IP Infrastructure Provisioning"; IEEE; 2011 Third IEEE International Conference on Cloud Computing Technology and Science; © 2011 IEEE; pp. 679-684.

Salah et al.; "Towards a personalized trust management system"; IEEE; 2012 International Conference on Innovations in Information Technology (IIT); Abu Dhabi; Date of Conference: Mar. 18-20, 2012; pp. 373-378; <http://ieeexplore.ieee.org/xpl/articleDetails.jsp?arnumber=6207771>.

"Cloud Brokerage Service with SLA"; Authors et al.: Disclosed Anonymously, An IP.com Prior Art Database Technical Disclosure; IP.com No. 000212006; IP. com Electronic Publication: Oct. 24, 2011; pp. 1-3.

\* cited by examiner

*Primary Examiner* — Anand Loharikar
(74) *Attorney, Agent, or Firm* — Ken Han; George S. Blasiak; Heslin Rothenberg Farley & Mesiti PC

(57) ABSTRACT

A method, computer program product and computer system is provided. A processor identifies a cloud service offered by a service provider. A processor determines at least one feature of the cloud service. A processor determines a first categorization of the cloud service based, at least in part, on the at least one feature. A processor generates a publication of the cloud service for a cloud marketplace based, at least in part, on the first categorization and a second categorization of the cloud marketplace.

20 Claims, 7 Drawing Sheets

MARKETPLACE SUGGESTIONS FOR CLOUD SERVICE PROVIDERS

BACKGROUND OF THE INVENTION

The present invention relates generally to the field of cloud services, and more particularly to providing suggestions for marketplaces that offer cloud services.

The advent of cloud computing has made it possible to deliver computing as a service rather than a standalone product. When computing infrastructure is offered as a service, where customers can use or rent the computing resources, it is referred to as infrastructure-as-a-service (IaaS). Similarly, when software platforms themselves are offered as services for use on cloud, they are called platform-as-a-service (PaaS). When software applications are offered on the cloud as services, they are called software-as-a-service (SaaS). The web-based delivery model of these services makes it easy for service providers to better manage their services (upgrades, support, fixes, etc.) and eliminates the need to install and manage applications themselves for on devices owned and operated by users of the services. As a result, cloud-based delivery of infrastructure, software and services is catching on significant momentum in the Infrastructure Technology (IT) landscape of companies. To deliver their services to their customers in a streamlined manner, several service providers are setting up what are called cloud marketplaces.

A Cloud Marketplace is an online commerce channel for service providers to sell their, and other provider's, services to customers. For example, online commerce capabilities include searching or browse services, purchasing services, rating or reviewing services, viewing recommendations, social commerce (e.g., support chat, blogs, forums, video sharing etc.), cross-sell, up-sell or merchandising. Furthermore, a cloud marketplace provides mechanisms for initiating or requesting the provisioning or de-provisioning of services, version management and digital asset management unique to cloud based services. Service providers that provide a large number of services sometimes create their own marketplace of to reach out to customers directly. On the other hand, smaller service providers who have fewer services may choose to participate in as many of the marketplaces as possible to reach out to the marketplaces' customers.

SUMMARY

Embodiments of the present invention provide a method, system, and program product to provide suggestions for cloud marketplaces to publish a cloud service. A processor identifies a cloud service offered by a service provider. A processor determines at least one feature of the cloud service. A processor determines a first categorization of the cloud service based, at least in part, on the at least one feature. A processor generates a publication of the cloud service for a cloud marketplace based, at least in part, on the first categorization and a second categorization of the cloud marketplace.

DETAILED DESCRIPTION

Figure 1:
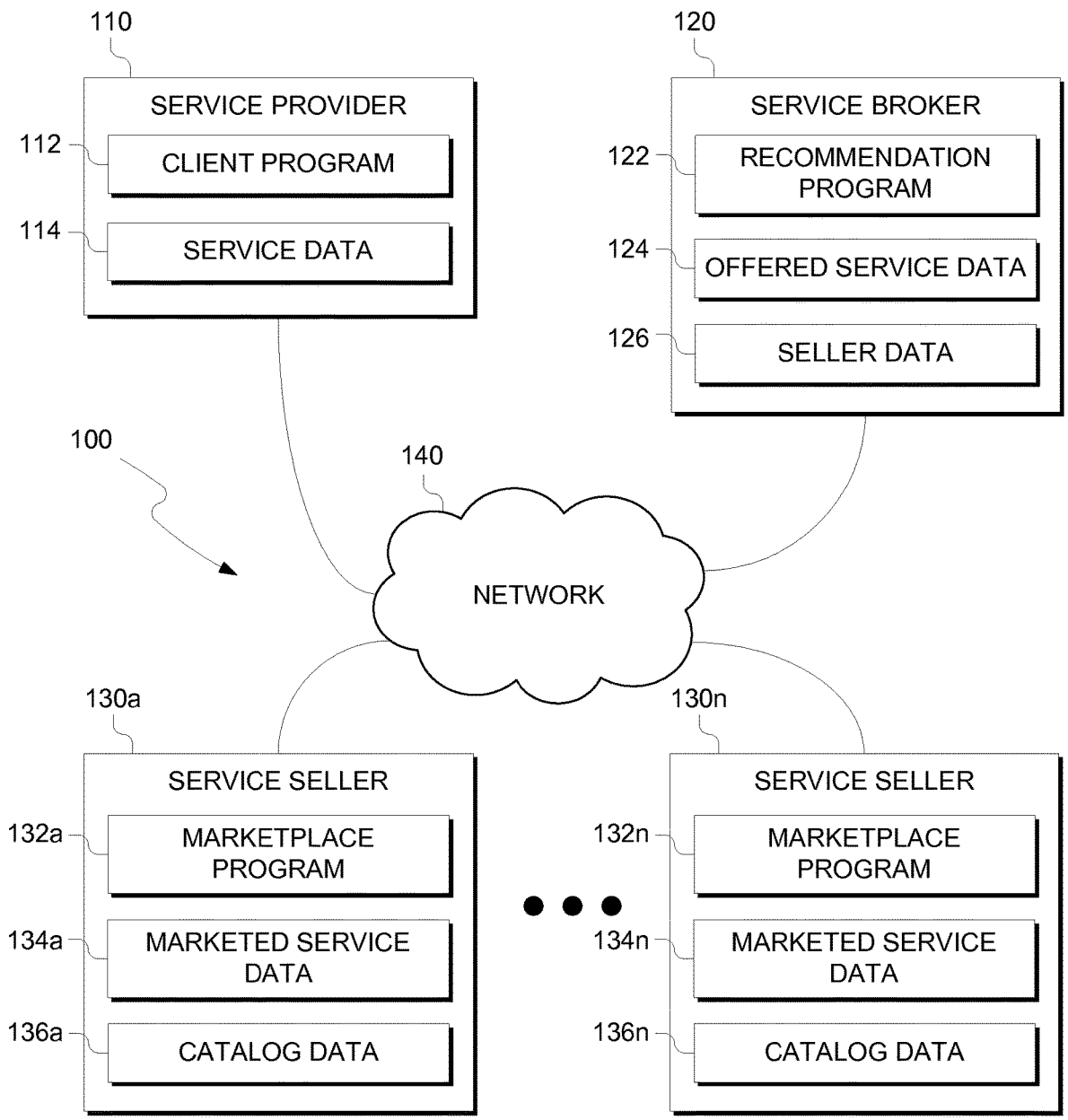
FIG. 1 is a functional block diagram illustrating a cloud service marketplace environment, in accordance with an exemplary embodiment of the present invention.

Embodiments of the present invention recognize that while solutions to publishing a service on a cloud marketplace are known, they often require direct knowledge of each marketplace and how it operates in order to publish a service. Embodiments of the present invention recognize that categorization of services, and other requirements to host a service, on each marketplace varies and, as such, requires additional changes or information from a service provider for each marketplace the cloud service is to be published on. Embodiments of the present invention provide collection of the categorization and requirements of each marketplace and transformation of a single publication to meet the requirements of each marketplace, allowing for simple and fast publication of services to multiple marketplaces based on a single submission. Embodiments of the present invention recognize that some previous solutions required the service provider to gather information about each marketplace, such as commissions charged by the marketplace or the clientele serviced by the marketplace. Embodiments of the present invention recognize that such information is often needed by service providers to make a determination regarding which marketplaces would be the best fit to publish services offered by the service provider. Embodiments of the present invention provide collection of information regarding cloud marketplaces, either provided by the cloud marketplace or collected independently, and provide to a service provider suggestions as to the best marketplaces to publish their services.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating cloud service marketplace environment, generally designated 100, in accordance with one embodiment of the present invention. Cloud service marketplace environment 100 includes service provider 110, service broker 120 and service sellers 130*a-n* connected over network 140. Service provider 110 includes client program 112 and service data 114. Service broker 120 includes recommendation program 122, offered service data 124 and seller data 126. Service sellers 130*a-n* each include a respective marketplace program 132*a-n*, marketed service data 134*a-n* and catalog data 136*a-n*.

In various embodiments of the present invention, service provider 110, service broker 120 and service sellers 130*a-n* are each computing devices that can each be a standalone device, a server, a laptop computer, a tablet computer, a netbook computer, a personal computer (PC), or a desktop computer. In another embodiment, service provider 110, service broker 120 and service sellers 130*a-n* each represent a computing system utilizing clustered computers and components to act as a single pool of seamless resources. In general, service provider 110, service broker 120 or service sellers 130a-n can each be any computing device or a combination of devices with access to service data 114, offered service data 124, seller data 126, marketed services data 134a-n, and catalog data 136a-n and is capable of executing or accessing client program 112, recommendation program 122 and marketplace programs 132a-n. Service provider 110, service broker 120 and service sellers 130a-n may each include internal and external hardware components, as depicted and described in further detail with respect to FIG. 4.

In this exemplary embodiment, client program 112 and service data 114 are stored on service provider 110. Recommendation program 122, offered service data 124 and seller data 126 are stored on service broker 120. Marketplace programs 132a-n, marketed service data 134a-n and catalog data 136a-n are each stored on respective service seller 130a-n. However, in other embodiments, client program 112, service data 114, recommendation program 122, offered service data 124, seller data 126, marketplace programs 132a-n, marketed service data 134a-n and catalog data 136a-n may be stored externally and accessed through a communication network, such as network 140. Network 140 can be, for example, a local area network (LAN), a wide area network (WAN) such as the Internet, or a combination of the two, and may include wired, wireless, fiber optic or any other connection known in the art. In general, network 140 can be any combination of connections and protocols that will support communications between service provider 110, service broker 120 and service sellers 130a-n, in accordance with a desired embodiment of the present invention.

In various embodiments, service provider 110 is a cloud service provider. Cloud service providers provide some form of IT infrastructure that is commercially distributed and sourced across several subscribers (e.g., users of the cloud service). Cloud service providers deliver such services to subscribers through on-demand, pay-as-you-go systems. Cloud service providers permit customers access to cloud computing resources to provide the services. Typically, cloud subscribers are billed for resources and services used according to a agreed billing method between the cloud service provider and the subscriber. Example cloud services include, but are not limited to: Infrastructure as a Service (IaaS) (e.g., providing virtual servers, storage, database, desktops, or other devices); Software as a Service (SaaS) (e.g., providing software services, such as an email client, to subscribers); Platform as a Service (PaaS) (e.g., combining of IaaS and SaaS delivered as a unified service, such as an email database and client).

In various embodiments, service provider 110 offers at least one cloud service. Service provider 110 communicates with service broker 120 to find and publish the cloud service to one or more service sellers 130a-n, collectively referred to as service sellers 130. Service sellers 130 each operate a cloud marketplace that offers a variety of cloud services to customers, either provided by a service seller (e.g., service seller 130a), service provider 110, or other service providers (not shown). As a customer subscribes to the services, a service seller (e.g., service seller 130a) collects payment details of the customer, or in some embodiments, collects payment for the service. In exchange, the service seller (e.g., service seller 130a) provides to the user information to access the service of service provider 110. As discussed herein, service broker 120 provides programs and modules to store the data associated with the service (e.g., description and access information) in a format that can be converted to comply with the formatting and requirements of each of the service sellers 130. In some embodiments, service broker 120 is a third party providing recommendations and publishing services for service provider 110. In other embodiments, service broker 120 is operated by service provider 110 as an installed program or service. In another embodiment, service broker 120 is operated by a service seller (e.g., service seller 130a).

In various embodiments, service provider 110 includes client program 112. Client program 112 receives input from a user of a cloud computing service provider regarding the various cloud services provided by the cloud computing service provider. As discussed herein, client program 112 receives information describing the services provided by the cloud computing service provider and presents recommendations for marketplaces to publish the services. In some embodiments, client program 112 is a web browser or other client program to communicate with recommendation program 122 of service broker 120. Recommendation program 122 provides a web portal for access via a web browser or similar program.

In various embodiments, client program 112 receives service data 114 describing one or more services provided by a cloud computing service provider. For a given service, service data 114 includes, but is not limited to, a name of the service; descriptions of the service (e.g., functions tasks the cloud service performs or other features of the cloud service); information for categorizing or indexing the service (e.g., categories or sub-categories the service falls under, tags or other metadata describing the service of functions of the service, or any other information regarding the type of service provided by the cloud service); documentation related to the service (e.g., screenshots, manuals, support documents, or any text, images, audio, or video used to document the service); pricing and licensing (e.g., subscription rates, users per subscription, and other terms of the agreement); and information regarding access to the service (e.g., location information such as a Uniform Resource Locator (URLs), application programming interfaces (APIs), documentation for accessing the service, and any other information required for provisioning a cloud service to a user of the service). Client program 112 receives service data 114 from a user regarding services the cloud computing service provider would like to offer on one or more service marketplaces. Client program 112 sends data for services being offered, included in service data 114, to recommendation program 122.

In various embodiments, service broker 120 includes recommendation program 122. Recommendation program 122 receives service data 114 from client program 112 of service provider 110, where the received service data 114 describes one or more cloud services that a cloud service provider is offering for publishing on one or more marketplaces. Recommendation program 122 determines the content of received service data 114. For example, recommendation program 122 determines the content of a service description by way of natural language processing or semantic matching of the text used to describe the service. Based on the determined content, recommendation program 122 determines a taxonomy of categorization of the service. The service description describes a service for payroll. The template includes categories for 'human resources' and a related sub-category 'payroll'. Recommendation program 122 selects the 'human resources' category and 'payroll' sub-category when categorizing the service. In various embodiments, based on the determined content, recommendation program 122 stores the determined content in offered service data 124 using a model or template used to describe a variety of cloud services. In some embodiments, a user of client program 112 enters information manually into the template. In various embodiments, the template includes a standardization of descriptors and other requirements used by various cloud marketplaces to publish services on said marketplaces. For example, a marketplace includes descriptions of a service in a field called "Features" and another marketplace includes descriptions of a service in a field called "Overview". Recommendation program 122 maps descriptions of a service to both types of fields.

In some embodiments, seller data 126 includes a transformation or mapping of fields in the template to the descriptors and other requirements used by each cloud marketplace. When a service is published to a given marketplace, recommendation program 122 transforms the offered service data 124 template of a given service using the mapping indicated for the selected marketplace in seller data 126. For example, the template of service broker 120 includes a various taxonomies or categorization of services. A service seller (e.g., service seller 130a) has a different taxonomy of services to categorize the services offered on the marketplace when compared to another service seller (e.g., service seller 130n). Seller data 126 includes a mapping or transformation between the template and the corresponding categories used by a particular marketplace. When a service is published to a marketplace, recommendation program 122 transforms the categories for a service, as used in the template, to the categories used by the marketplace.

In some embodiments, client program 112 presents the template to a user to enter information about a cloud service. As such, client program 112 ensures the information conforms to the template without the need to determine and map service data 114 to the template. In some embodiments, the template of an offered service stored in offered service data 124 includes one or more categories the offered service may be categorized under. For example, when generating a template, recommendation program 122 determines one or more categories, or sub-categories, the service falls under. Based on the determined content of the service description, recommendation program 122 determines one or more categories for the service. In some embodiments, recommendation program 122 automatically selects one or more categories for a service. In other embodiments, recommendation program 122 sends a list of suggestions to client program 112 for a selection by a user of client program 112. In an embodiment, when manually entering information into a template, a user of client program 112 selects one or more categories for the offered service.

In various embodiments, recommendation program 122 transforms the determined or received categories of a service to match the categorization structure of a cloud marketplace, when said marketplace is selected for publishing of the service. Seller data 126 for each marketplace includes a mapping between the categories, and sub-categories, of a template to the categories used by the marketplace. Each service seller (e.g., service seller 130a) includes a respective catalog data 136a-n, collectively referred to as catalog data 136, used to categorize services published to the marketplace operated by each service seller (e.g., service seller 130a). Recommendation program 122 retrieves the catalog data 136 of the service seller (e.g., catalog data 136a of service seller 130a). Based on the categorization used by the service seller 130a-n, recommendation program 122 determines a mapping between the categories of the template used for offered services and the categories of the used the marketplace of the seller.

For example, service provider 110 offers a service for customer relationship management (CRM). Recommendation program 122 determines the categories of the template for the offered service to be populated by the service category 'Sales' and sub-category 'Relationship Management'. A marketplace categorizes CRM services under 'Operations Support', stored in the catalog data of the respective service seller (e.g., catalog data 136a of service seller 130a). Recommendation program 122 generates a mapping of catalog data 136 to the categories used in populated templates of offered service data 124. The corresponding seller data 126 of the first marketplace includes the mapping. As such, recommendation program 122 maps the service under the 'Sales-Relationship Management' categorization to the 'Operations Support' category when published to the marketplace. In some embodiments, the mapping a categories of the template and each marketplace may be manually entered in seller data 126 by an owner or administrator of service broker 120. In other embodiments, a marketplace includes tags or other descriptors to categorize services. In such scenarios, recommendation program 122 determines one or more tags for a service in an instance of the template for the service. Furthermore, seller data 126 includes a mapping of the tags used by each marketplace to categories or tags of the template.

In various embodiments, recommendation program 122 generates a list of marketplace to publish a cloud service of service provider 110. Upon generating a completed template for a service, recommendation program 122 stores the completed template in offered service data 124. Recommendation program 122 compares the completed template in offered service data 124 for a service of service provider 110 to seller data 126 for each of the service sellers 130. Seller data 126 includes catalog data 136 for each of the service sellers 130 to determine the categorization of the service if published to a marketplace of a service seller (e.g., service seller 130a). Furthermore, seller data 126 includes, but is not limited to, the following for each of the service sellers 130: a rating or reputation of the marketplace operated by each of the service sellers 130; commissions charged for services published on each marketplace operated by the service sellers 130 (e.g., the percentage of a subscription charged by the marketplace for users who subscribe for the service via the marketplace); group license discounting guidelines for services published on each marketplace operated by the service sellers 130 (e.g., are volume discounts available when publishing and what size of groups can be monitored by the marketplace); payment or collections methods of each marketplace operated by the service sellers 130 (e.g., cash or credit permitted for payment, the frequency of collection for a subscription such as weekly or monthly); and the activity of the marketplace, as a whole or based on categories, of each marketplace operated by the service sellers 130 (e.g., the amount of subscribers of the marketplace as a whole or the amount of subscribers for one or more categories in a marketplace). In some scenarios, recommendation program 122 receives seller data 126 for each marketplace from the respective service sellers 130. In other scenarios, recommendation program 122 retrieves seller data 126 from other sources such as independent review or reporting entities. In some embodiments, seller data 126 also includes sales environment data regarding each marketplace. For example, competition data includes, but is not limited to, a list other services published on a marketplace and the respective service provider of each, the distribution of services types among categories of the marketplace, the popularity of others services (e.g., an amount of subscribers per category), and the price of other services.

In various embodiments, based on a comparison of the seller data 126 and the completed template for a service, recommendation program 122 determines the marketplaces of service sellers 130 that match the completed template of cloud service. In scenarios where no matching categories can be found for a service seller (e.g., service seller 130a), recommendation program 122 sends a message to client program 112 indicating that a matching marketplace does not have a category corresponding to the cloud service. Furthermore, recommendation program 122 may send an instruction or message to the matching marketplace to create a category based on the categorization of the template used by service broker 120. By alerting the marketplace of missing categories for covered by service provider 110, recommendation program 122 of service broker 120 informs the marketplace of potential new, emerging categories of cloud services. Similarly, recommendation program 122 may send the instruction or message to other marketplaces, alerting them of new service categories. In some embodiments, recommendation program 122 receives one or more search criteria from a user of service provider 110 via client program 112. Based on the received search criteria, recommendation program 122 determines the marketplaces of service sellers 130 that match the cloud service and the received search criteria. For example, recommendation program 122 receives search criteria regarding marketplaces that charge less than twenty percent commission on subscriptions. Recommendation program 122 includes suggestions of marketplace that charge less than twenty percent commission.

In various embodiments, recommendation program 122 determines a ranking of the marketplaces that match the completed template and, in some embodiments, one or more search criteria. In some scenarios, recommendation program 122 determines a ranking on based on an ordering of one or more pieces of information in seller data 126. For example, recommendation program 122 determines a rank based on the ordering of commission rates charged by the list of marketplaces (e.g., where marketplaces with lower commissions are presented in the list prior to those with higher commissions). In other scenarios, recommendation program 122 determines the ranking of marketplaces in a list based on sales environment data. For example, marketplaces with fewer competitor services in a category of the service of service provider 110 may be ranked higher than those with a more crowded marketplace (e.g., more competitor services).

In various embodiments, recommendation program 122 sends the list to client program 112. Client program 112 presents the list to the user. In some scenarios, client program 112 receives additional search criteria from the user and in response, sends the updated search criteria to recommendation program 122 for a new list. In other scenarios, client program 112 provides an interface for the user to filter and sort the received list. In various embodiments, client program 112 receives a selection of one or more marketplaces to publish the cloud service. Client program 112 sends the list of selected marketplaces to recommendation program 122. Recommendation program 122 transforms the completed template for the cloud service for each selected marketplace. For each selected marketplace, recommendation program 122 sends the transformed templates to the respective marketplace programs 132a-n, collectively marketplace program 132.

In various embodiments, marketplace programs 132 present the published cloud services for purchase on the cloud marketplace for each of the service sellers 130. Information describing each published cloud service on a given cloud marketplace is stored in marketed service data 134a-n, collectively marketed service data 134, of the respective service seller 130a-n. For each service published on a marketplace, marketed service data 134 includes, but is not limited to, descriptions of the service in a given marketplace, and other information describing a service (e.g., screenshots, videos, user manuals, etc.), information or data for access to the service, categories of catalog data 136 the service is presented in a given marketplace, pricing information of the service (e.g., base price, group license discounts, sales, promotions or other types of seasonal discounts, etc.), user ratings or reviews of the service, subscribers of the service, and the licenses agreed and subscribed to by the subscribers (e.g., the price and term of the subscription).

When recommendation program 122 sends a transformed template to be published to a marketplace, the marketplace program of the service seller operating the marketplace (e.g., marketplace program 132a) publishes the service, storing the transformed template in the marketed service data of the marketplace (e.g., marketed service data 134a). As the service is published and presented on the marketplace, the marketplace program of the service seller (e.g., marketplace program 132a) gathers information received from users of the marketplace in the marketed service data of the marketplace (e.g., marketed service data 134a), such as purchase request and reviews. In some scenarios, each of the marketplace programs 132 send updated marketed service data 134 as such information is created (e.g., when a customer subscribes to a service or leaves a review) to recommendation program 122. In other scenarios, the updated marketed service data 134 is sent in batches at predetermined times or through a request initiated by recommendation program 122.

In various embodiments, recommendation program 122 collects marketed service data 134 from each marketplace a cloud service has been published. Furthermore, recommendation program 122 collects marketed service data 134 from multiple cloud marketplaces, storing the results in offered service data 124 for cloud services offered through service broker 120 by service provider 110. Client program 112 receives offered service data 124 with updated cloud service information indicating current or new subscribers, user reviews, and other information collected across multiple cloud marketplaces. In some scenarios, client program 112 sends the updated offered service data 124 to a cloud platform operated by service provider 110 to perform certain actions, such as provisioning a cloud service for use to a new subscriber. In other scenarios, client program 112 collates information across multiple marketplaces and presents the information to the user. For example, client program 112 presents a subscription summary (e.g., subscription payments collected for a period across all or individual marketplaces) or an average user review across all marketplace the service is published.

Figure 2A:
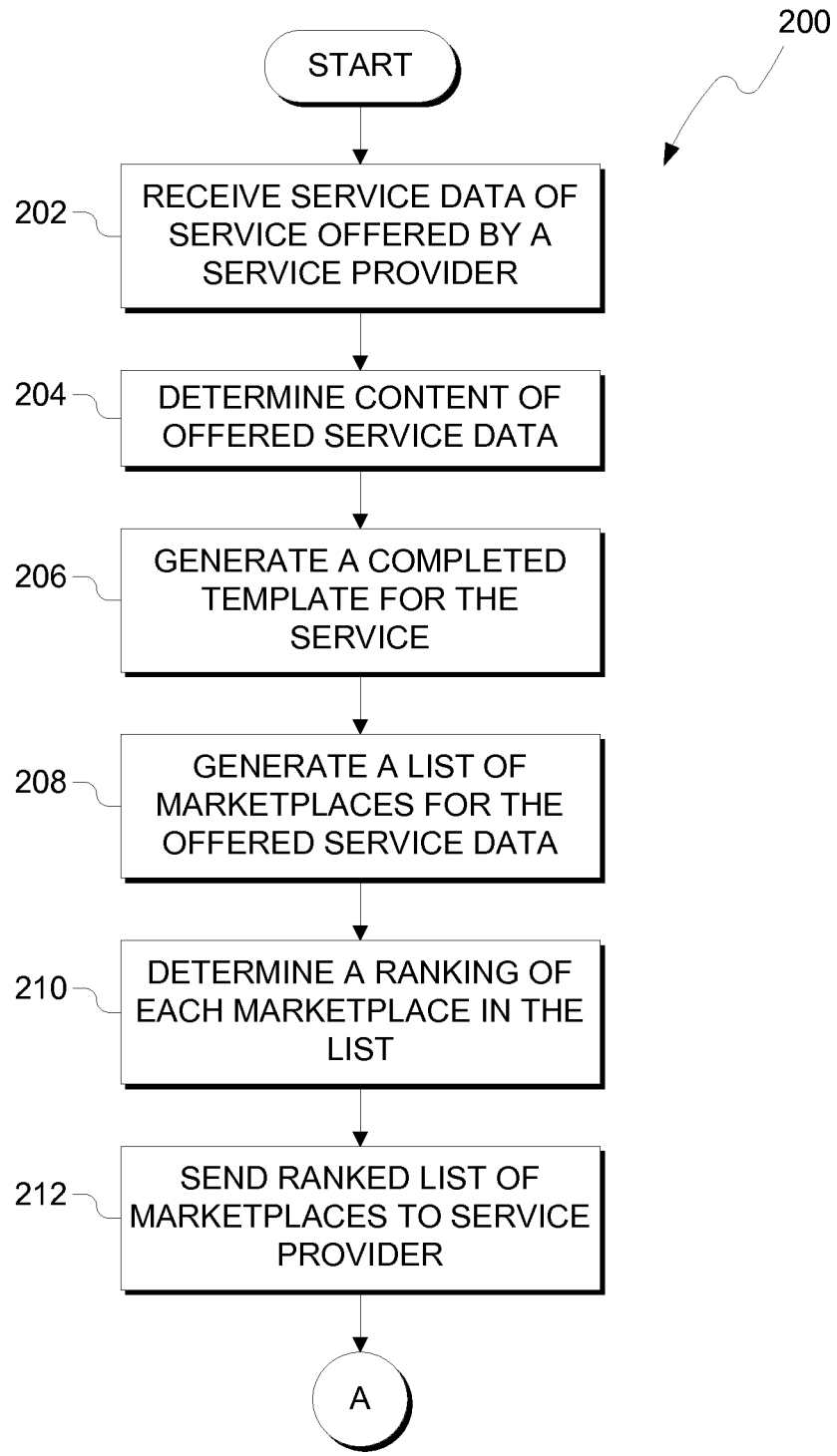
FIGS. 2A-B illustrates operational processes of a recommendation program for publishing a service, on a computing device within the environment of FIG. 1, in accordance with an exemplary embodiment of the present invention.
Figure 2B:
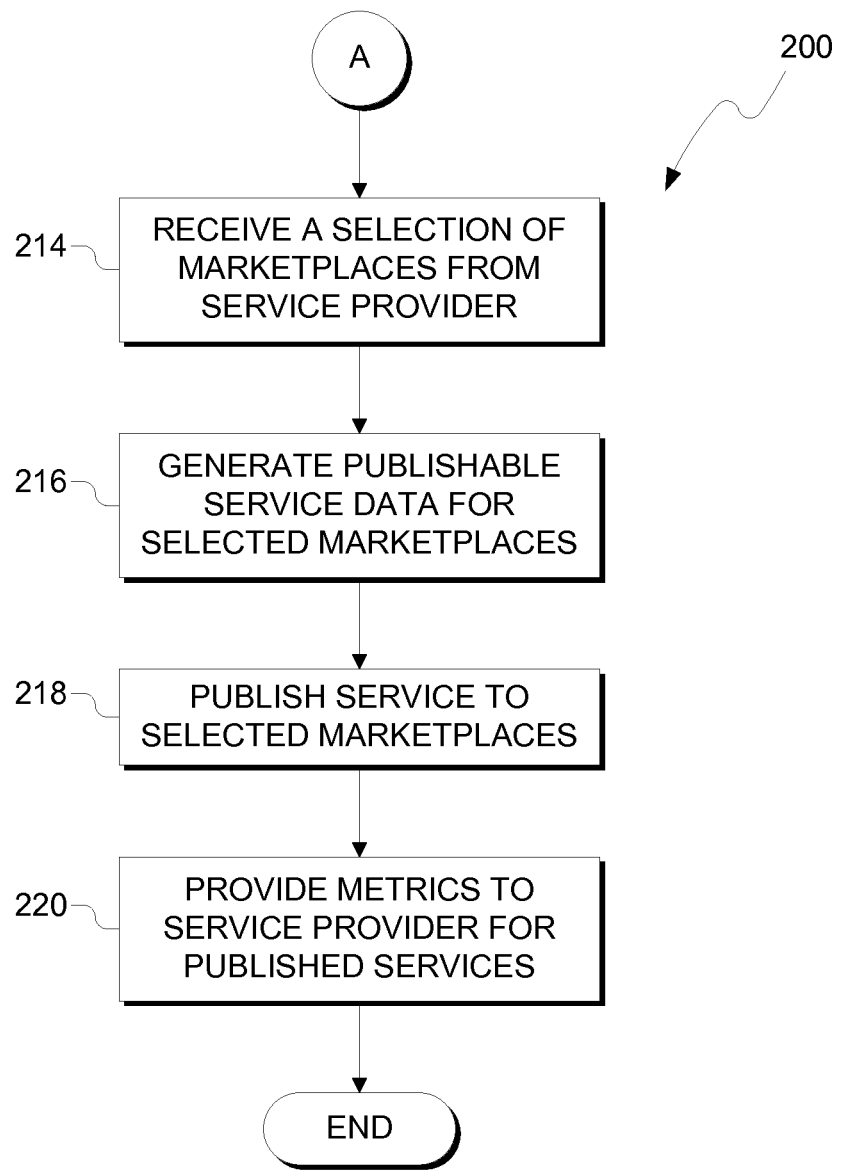

FIGS. 2A-B illustrates operational processes, generally designated 200, of recommendation program 122. In process 202, recommendation program 122 receives service data 114 from service provider 110 for one or more cloud services service provider 110 is offering for publication. Service data 114 includes, but is not limited to, a description of the cloud service, information for accessing or provisioning the cloud service upon subscription by a user, screenshots or videos illustrating the operation of the service, pricing information of the service (e.g., rate charged for a subscription, group license discounts, sales or other seasonal discounts), support documents, and any policies or licensing agreements required to followed when using the service. In process 204, recommendation program 122 determines the content of the offered service. Recommendation program 122 performs natural language processing to the description of a service to determine the functions the service provides to subscribers.

In process 206, recommendation program 122 generates a completed template for the service based on the received service data 114 and determined content of the description of the service. Service broker 120 includes a generalized template covering various types of information required to be present when publishing a cloud service to multiple cloud marketplaces. Recommendation program 122 generates a completed template inserting the relevant service data 114 into fields of the template. For example, the template includes entries for access information to a service. Recommendation program 122 includes service data 114 relevant to accessing the service (e.g., URLs and authentication procedures for accessing the service). In various embodiments, recommendation program 122 determines one or more categories of classification for the cloud service. Example categories include, but are not limited to, "Sales and Marketing", "Security", "Analytics" or any other descriptor of the functions a cloud service can perform. Furthermore, some categories may have sub-categories, such as "Sales and Marketing" could have a "Sales Lead Tracking" service sub-category. Based on the description of the cloud service, recommendation program 122 determines the functions of the service. Recommendation program 122 classifies the determined functions using the categories of the template, thereby determining the categories of the service. In some embodiments, client program 112 presents the template to a user for manual entry of service data 114. For example, a user may enter the description and categories directly into the template. In other embodiments, recommendation program 122 may prompt a user of client program 112 for additional information or to verify entered information when completing a template for a service.

In process 208, recommendation program 122 generates a list of marketplaces for the offered service to be published under. In some embodiments, recommendation program 122 receives one or more search criteria to determine marketplaces to include in the list, such as seller data 126 for each marketplace. For example, recommendation program 122 receives a search criteria limiting the commission a marketplace charges to a value below a threshold percentage. In response, recommendation program 122 generates a list of marketplaces that meet the search criteria (e.g., the commission of each marketplace in the list is below the threshold). In process 210, recommendation program 122 determines a ranking for each marketplace in the list. In some embodiments, recommendation program 122 ranks the list based on one or more search criteria (e.g., the marketplaces with the lowest commission are ranked higher). In other embodiments, recommendation program 122 receives additional information for ranking a marketplace. For example, recommendation program 122 receives ranks marketplaces with more users or higher rating higher than those with fewer users or lower ratings.

In process 212, recommendation program 122 sends the ranked list to client program 112 for display to the user. Client program 114 presents the list to the user. In some embodiments, client program 112 receives additional search criteria or ranking information. In response, client program 112 sends a request for a new ranked list of marketplace to recommendation program 122. Recommendation program 122 generates a new ranked list. Recommendation program 122 sends the new ranked list to client program 112 for display to the user. In process 214, recommendation program 122 receives a selection from the user of one or more marketplaces to publish the offered service. In some embodiments, recommendation program 122 receives additional information regarding the selected marketplaces. For example, recommendation program 122 receives new pricing information for each marketplace when a request to publish the service to the marketplaces is received. Based on commission charged or other factors, a user may decide to alter pricing information for a specific marketplace (e.g., to ensure the charged subscription is the same to users of all of the marketplaces).

In process 216, recommendation program 122 generates publishable service data for each of the selected marketplaces. For each marketplace, service broker 120 includes seller data 126 that includes, but is not limited to, a transformation between the template used by recommendation program 122 and the publishing requirements of each marketplace. For example, one marketplace has a known taxonomy for cataloging services (e.g., catalog data 136a) published on the marketplace. Recommendation program 122 transforms the categorization of the template to a format matching the marketplace's categorization. In process 218, recommendation program 122 publishes the service to each of the selected marketplace. Recommendation program 122 sends the transformed templates for each marketplace to the respective marketplace programs 132 of the selected marketplaces. The respective marketplace programs 132 publish the service for purchase or subscription by users of the marketplaces. As users interact with the published services, the respective marketplace programs 132 information describing the user interactions with the respective marketed services data 134 of the marketplace. In some embodiments, information, such as users who subscribed to the service, payment details, ratings of the service, and other usage metrics, is included in marketed services data 134.

In process 220, recommendation program 122 receives usage metrics from the respective marketplace programs 132 of the selected marketplaces. Recommendation program 122 provides reports of the usage metrics to service provider 110. In some embodiments, information in the reports includes, but is not limited to, one or more of the following: payment details of subscribers to charge for cloud services, provisioning requests for new users, de-provisioning requests for users canceling a subscription, user ratings of the service, and billing reports from the cloud marketplaces.

Figure 3:
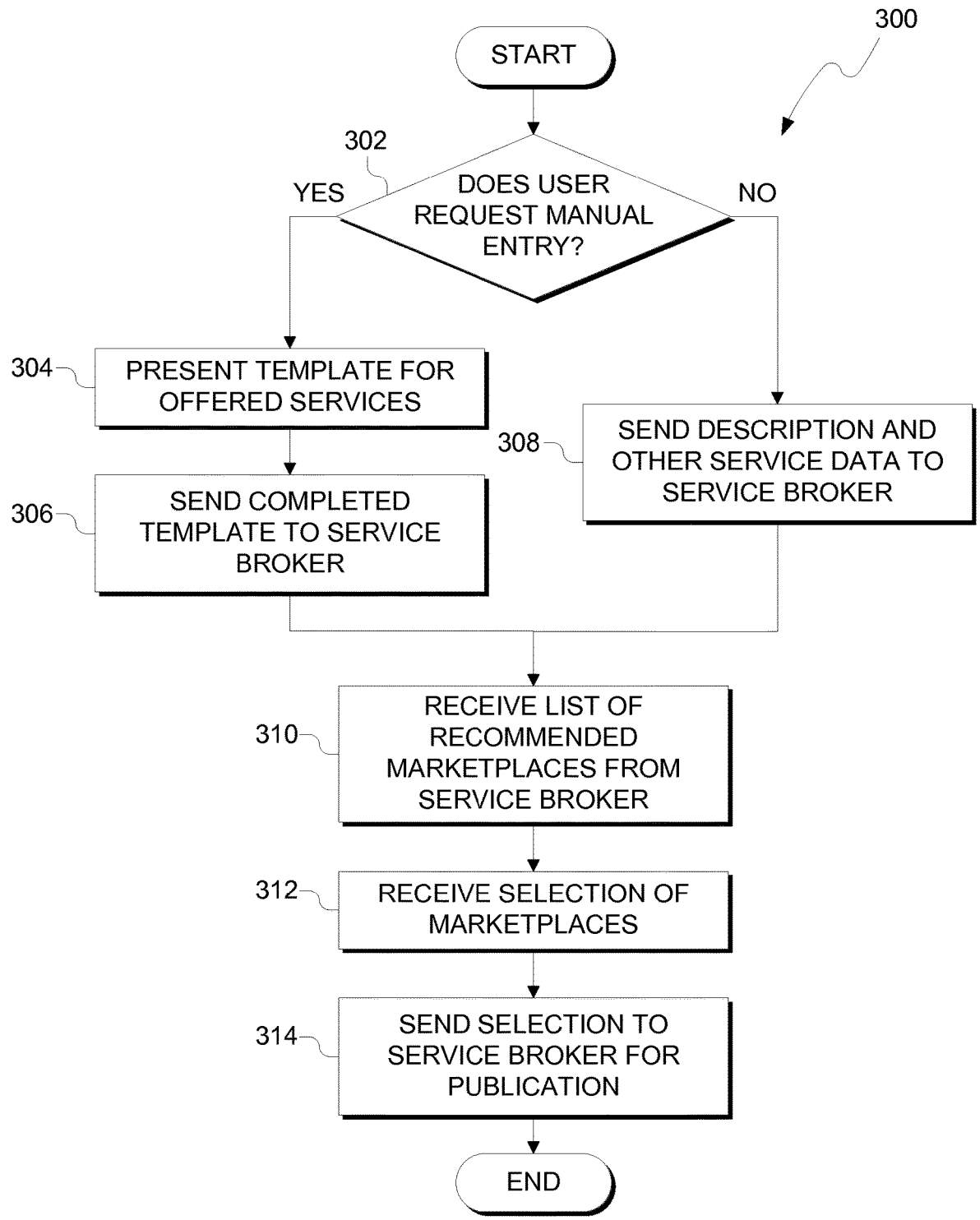
FIG. 3 illustrates operational processes of a client program for selecting cloud marketplaces to publish a cloud service, on a computing device within the environment of FIG. 1, in accordance with an exemplary embodiment of the present invention.

FIG. 3 illustrates operational processes, generally designated 300, of client program 112 for selecting cloud marketplaces to publish a cloud service. In process 302, client program 112 receives a selection from the user if the user would like to manually complete a template for a cloud service or have recommendation program 122 automatically complete a template. If client program 112 determines that the user would like to complete a template manually, based on received user input (YES branch of process 302), then client program 112 presents an interface displaying the template (process 304). For example, in one embodiment and scenario, a user enters information into the fields of the template. As such, based on the detection of the user input in the fields of the template, client program 112 determines that the user wishes to complete the template manually. In some embodiments, client program 112 includes error detection or correction modules to ensure completeness and correctness of the completed template. In another embodiment, the user completes the template in another application or while not connected to service broker 120 and, at a later time, provides the completed template to service broker 120. Once the template is completed, client program 112 sends the completed template to recommendation program 122 of service broker 120 (process 306).

If client program 112 determines that a user would like to have recommendation program 122 automatically generate a completed template (NO Branch of process 302), then client program 112 sends a description of the service along with other service data 114 to recommendation program 122 of service broker 120 (process 308). For example, in one embodiment and scenario, a user enters input that indicates to client program 112 that the user desires recommendation program 122 to automatically generate a completed template. As discussed herein, recommendation program 122 generates a completed template for the service. In some embodiments, client program 112 performs both processes 304 and 308. For example, recommendation program 122 may automatically complete some portions of the template for the offered service. For other portions, client program 112 may prompt a user to complete entry.

In process 310, client program 112 receives a list of recommended marketplaces from recommendation program 122 of service broker 120. Client program 112 displays the list to a user. In some embodiments, client program 112 receives input from a user to apply certain search criteria, order or rank the list, or resubmit a new search. In process 312, client program 112 receives a selection of one or more marketplaces to which the service is to be published. In process 314, client program 112 sends the selection of marketplaces to recommendation program 122 of the service broker 120. In response, recommendation program 122 transforms the completed template to match the publishing requirements of each marketplace. Recommendation program 122 sends a transformed template to each selected marketplace to publish the service.

Figure 4:
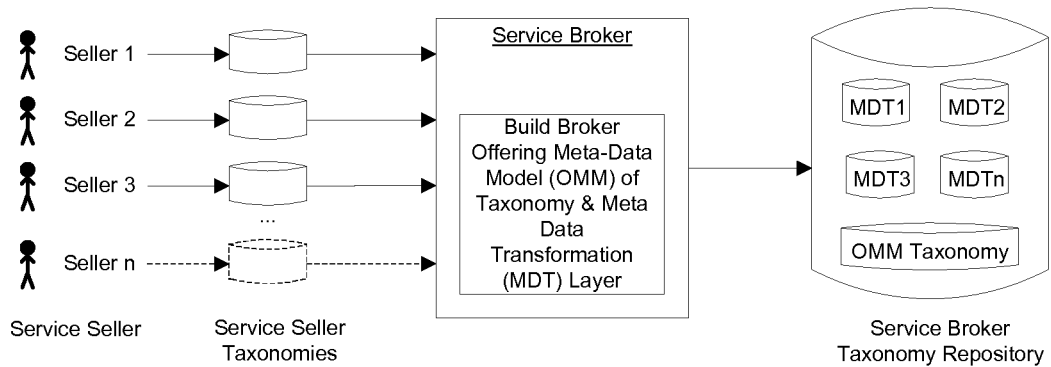
FIG. 4 depicts an illustrative example of collecting seller data from cloud service marketplaces.

FIG. 4 depicts an illustrative example of collecting seller data from cloud service marketplaces. The service broker 120 recruits service sellers 130. The methodology followed in this system is for a service seller (e.g., service seller 130a) to provide their service taxonomies to the broker. For example, a service taxonomy is a categorization of cloud service offered for sale or subscription of the cloud marketplace of the service seller (e.g., service seller 130a). Service broker 120 provides an interface that allows service sellers 130 to input the service taxonomies used by the respective cloud service marketplaces. Service broker 120 builds and updates an intelligent Offering Meta-Model (OMM) with the seller taxonomy information. For example, OMM is used to generate a template to cover the variety of different taxonomies used by the cloud marketplaces of service sellers 130. Service broker 120 simultaneously creates a Meta Data Transformation (MDT) layer that maps each service seller 130 taxonomy to the OMM. Service Broker then stores the updated Service Seller MDT layer and OMM in its repository called Service Broker Taxonomy Repository. Service broker 120 Offering Meta-Model Taxonomy is intelligent to accommodate new service seller taxonomy with no change if the taxonomy data sections preexist in OMM Taxonomy.

Figure 5:
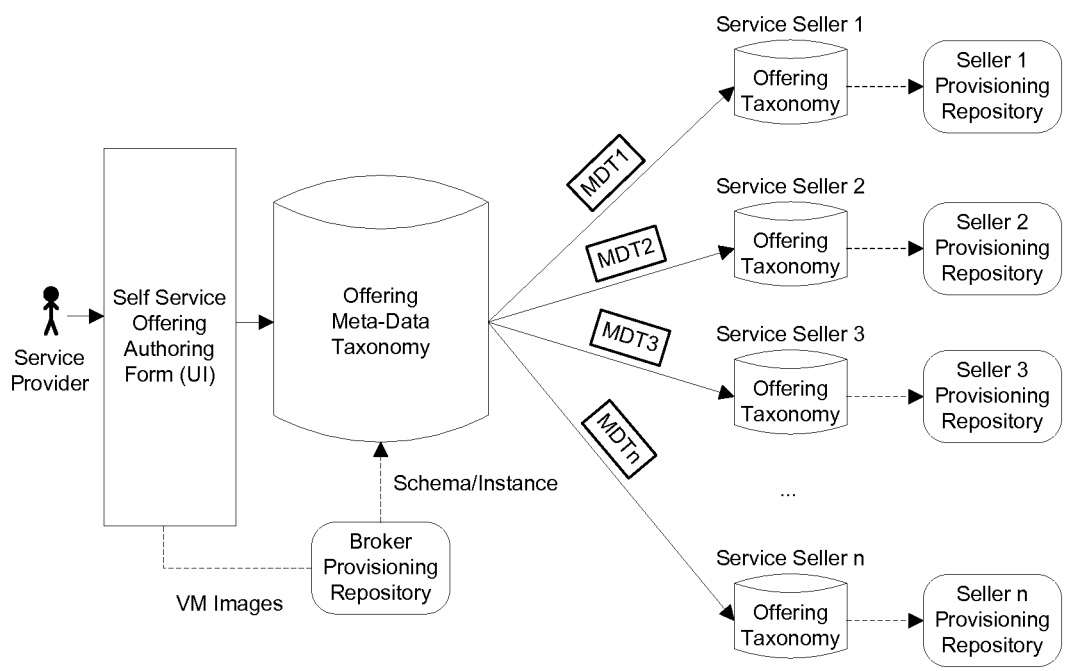
FIG. 5 depicts an illustrative example of transforming a cloud service to the taxonomy used by various cloud marketplaces.

FIG. 5 depicts an illustrative example of transforming a cloud service to the taxonomy used by various cloud marketplaces. Service broker 120 builds this system to allow smooth processing of service provider 110 authoring to service sellers 130. As part of this system service broker 120 builds an offering meta model that integrates to each of service sellers 130 systems using meta-model data transformation Layer, also called MDT layer. An MDT layer consists of one or more of following Service Seller service offering information: description of service, image(s), video(s), audio(s), pricing options (e.g., fixed price, range, seasonal price brackets), document(s), integration APIs, support information, provisioning URLs, or policies. Service broker 120 builds a Self-Service Offering Authoring Form as user interface for service provider 110 to input their cloud based product description and details. Service broker 120 then associates the information in the appropriate schema in Offering Meta-Model repository. The Offering Meta-Model repository consists of schema that maps appropriate MDT to each Service Seller service offering. Service broker 120 optionally provides a repository for provisioning the services for service sellers 130 that service provider 110 publishes to service sellers 130 respective cloud marketplaces. This provisioning comes to play when customer purchases service provider 110 service that is published in a store that does not handle in-store provisioning.

Service broker 120 provides the following services to the service providers for those seller services that have been provisioned. Service provisioning can be handled either directly by the service seller or by the broker on behalf of the service seller: usage aggregation, metering, (De) provisioning, ratings and reviews, or billing. Service provider 110 may subscribe to the provisioned offerings from the service broker 120. This subscription can be periodic or one-time based on the choice of service provider 110 for receiving the provisioned offering information.

Figure 6:
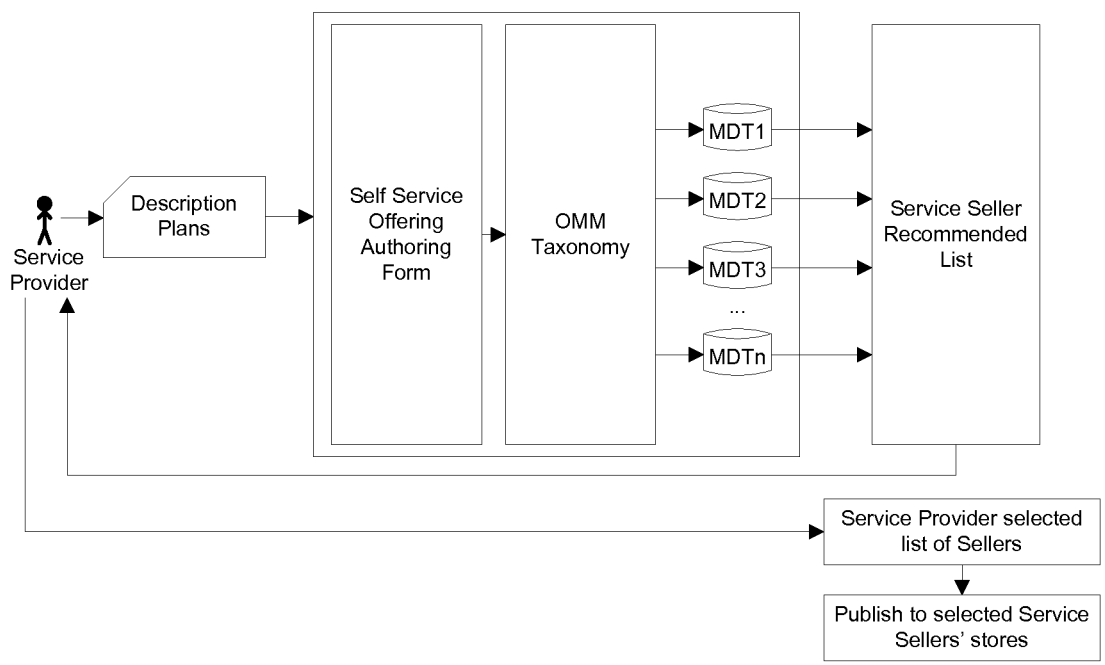
FIG. 6 depicts an illustrative example of recommending cloud marketplaces to a service provider.

FIG. 6 depicts an illustrative example of recommending cloud marketplaces to a service provider. In this example, service provider 110 provides offering description and selects from the matching service sellers 130 service broker suggests to publish their cloud based services. Service provider 110 feeds its cloud based product description and/or other MDT details in the Service Broker provided Self-Service Authoring Form. The service provider 110 based feed is processed through the intelligent MDT layer to match the appropriate Service Seller information. Service provider 110 receives the suggested service seller recommend list for the input feed of cloud based product. Service provider 110 chooses among the list of Sellers. Service provider 110 makes a decision to publish its cloud based product to the selected service sellers 130. Service broker transforms and generates the service provider 110 product MDT to the selected service sellers 130 based MDT layer transaction for each of the selected service sellers 130 cloud marketplace to publish. Each cloud marketplace of the selected service sellers lists the service of service provider 110 based on the service in its offering taxonomy. Post provisioning, service provider 110 makes a choice to receive the provisioned offerings for its cloud based services to all selected service sellers 130 marketplaces. This adds value to service provider 110 to quickly assess the customer activities and demand of their provisioned services.

Figure 7:
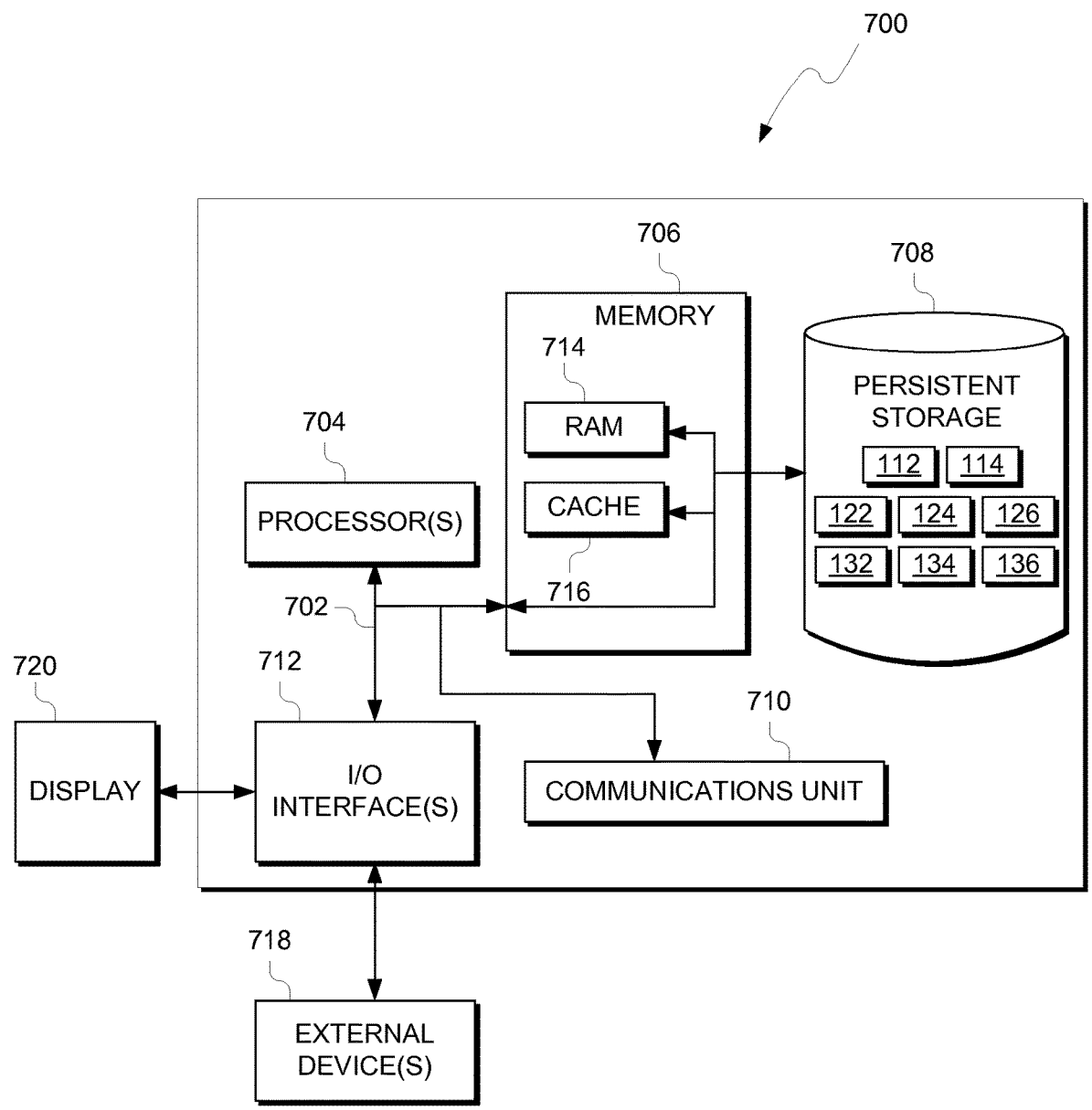
FIG. 7 depicts a block diagram of components of the computing device executing a recommendation program, a client program, or a marketplace program, in accordance with an exemplary embodiment of the present invention.

FIG. 7 depicts a block diagram, 700, of components for each of service provider 110, service broker 120, and service sellers 130a-n in accordance with an illustrative embodiment of the present invention. It should be appreciated that FIG. 7 provides only an illustration of one implementation and does not imply any limitations with regard to the environments in which different embodiments may be implemented. Many modifications to the depicted environment may be made.

Service provider 110, service broker 120, and service sellers 130a-n each include communications fabric 702, which provides communications between computer processor(s) 704, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer-readable storage media. In this embodiment, memory 706 includes random access memory (RAM) 714 and cache memory 716. In general, memory 706 can include any suitable volatile or non-volatile computer-readable storage media.

Client program 112, service data 114, recommendation program 122, offered service data 124, seller data 126, marketplace programs 132*a-n*, marketed service data 134*a-n* and catalog data 136*a-n* are each stored in persistent storage 708 for execution and/or access by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer-readable storage medium that is also part of persistent storage 708.

Communications unit 710, in these examples, provides for communications with other data processing systems or devices, including resources of network 140. In these examples, communications unit 710 includes one or more network interface cards. Communications unit 710 may provide communications through the use of either or both physical and wireless communications links. Client program 112, service data 114, recommendation program 122, offered service data 124, seller data 126, marketplace programs 132*a-n*, marketed service data 134*a-n* and catalog data 136*a-n* may be downloaded to persistent storage 708 through communications unit 710.

I/O interface(s) 712 allows for input and output of data with other devices that may be connected to service provider 110, service broker 120, or service sellers 130*a-n*. For example, I/O interface 712 may provide a connection to external devices 718 such as a keyboard, keypad, a touch screen, and/or some other suitable input device. External devices 718 can also include portable computer-readable storage media such as, for example, thumb drives, portable optical or magnetic disks, and memory cards. Software and data used to practice embodiments of the present invention, e.g., client program 112, service data 114, recommendation program 122, offered service data 124, seller data 126, marketplace programs 132*a-n*, marketed service data 134*a-n* and catalog data 136*a-n*, can be stored on such portable computer-readable storage media and can be loaded onto persistent storage 708 via I/O interface(s) 712. I/O interface(s) 712 also connect to a display 720.

Display 720 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method comprising:
   identifying, by one or more processors, a cloud service offered by a service provider;
   determining, by the one or more processors, at least one feature of the cloud service;
   generating, by the one or more processors, a cloud service template for the cloud service based, at least in part, on a taxonomy of the cloud service;
   determining, by the one or more processors, a first categorization of the cloud service based, at least in part, on the at least one feature;
   determining, by the one or more processors, a plurality of recommended cloud marketplaces based, at least in part, on a comparison of the cloud service template to one or more respective features of a plurality of cloud marketplaces;
   generating, by the one or more processors, a plurality of publication templates for the cloud service to the plurality of recommended clouds marketplaces based, at least in part, on (i) the cloud service template and (ii) one or more publishing requirements of the respective plurality of recommended cloud marketplaces; and
   publishing, by the one or more processors, the cloud service to a plurality of cloud marketplaces based, at least in part, on a respective publication template associated with a respective cloud marketplace of the plurality of cloud marketplaces.

2. The method of claim 1, the method further comprising:
   receiving, by the one or more processors, a search criteria; and
   generating, by the one or more processors, a list of matching cloud service marketplaces based, at least in part, on the search criteria.

3. The method of claim 2, wherein the search criteria includes one or more of the following: (i) a rating or reputation of the cloud service marketplaces; (ii) commissions charged by the cloud service marketplaces; (iii) licensing requirements of the cloud service marketplaces; (iv) payment or collections methods of the cloud service marketplaces; (v) group license discounts; or (vi) sales or other seasonal discounts.

4. The method of claim 2, wherein the search criteria includes one or more of the following: (i) a distribution of currently published services of the cloud service marketplaces; or (ii) a popularity of the currently published services of the cloud service marketplaces; or (iii) an amount of current subscribers for the currently published services of the cloud service marketplaces.

5. The method of claim 4, wherein the search criteria is further based, at least in part, on the first categorization of the cloud service.

6. The method of claim 4, the method further comprising:
   determining, by the one or more processors, a rank for at least one of the cloud service marketplaces in the list of matching cloud service marketplaces, wherein the rank is based, at least in part, on the search criteria.

7. The method of claim 1, the method further comprising:
generating, by the one or more processors, a report for a published cloud service, wherein the report includes at least one or more of the following: (i) payment details of one or more subscribers to the published cloud service; (ii) one or more provisioning requests for subscribers to the published cloud service; (iii) one or more de-provisioning requests for subscribers canceling a subscription to the published cloud service; (iv) user ratings of the published cloud service; or (v) billing reports from one or more cloud service marketplaces.

8. A computer program product comprising:
one or more computer-readable storage media and program instructions stored on the one or more computer-readable storage media, the program instructions comprising:
program instructions to identify a cloud service offered by a service provider;
program instructions to determine at least one feature of the cloud service;
program instructions to generate a cloud service template for the cloud service based, at least in part, on a taxonomy of the cloud service;
program instructions to determine a first categorization of the cloud service based, at least in part, on the at least one feature;
program instructions to determine a plurality of recommended cloud marketplaces based, at least in part, on a comparison of the cloud service template to one or more respective features of a plurality of cloud marketplaces;
program instructions to generate a plurality of publication templates for the cloud service to the plurality of recommended clouds marketplaces based, at least in part, on (i) the cloud service template and (ii) one or more publishing requirements of the respective plurality of recommended cloud marketplaces; and
program instructions to publish the cloud service to a plurality of cloud marketplaces based, at least in part, on a respective publication template associated with a respective cloud marketplace of the plurality of cloud marketplaces.

9. The computer program product of claim 8, the program instructions further comprising:
program instructions to receive a search criteria; and
program instructions to generate a list of matching cloud service marketplaces based, at least in part, on the search criteria.

10. The computer program product of claim 9, wherein the search criteria includes one or more of the following: (i) a rating or reputation of the cloud service marketplaces; (ii) commissions charged by the cloud service marketplaces; (iii) licensing requirements of the cloud service marketplaces; (iv) payment or collections methods of the cloud service marketplaces; (v) group license discounts; or (vi) sales or other seasonal discounts.

11. The computer program product of claim 9, wherein the search criteria includes one or more of the following: (i) a distribution of currently published services of the cloud service marketplaces; or (ii) a popularity of the currently published services of the cloud service marketplaces; or (iii) an amount of current subscribers for the currently published services of the cloud service marketplaces.

12. The computer program product of claim 11, wherein the search criteria is further based, at least in part, on the first categorization of the cloud service.

13. The computer program product of claim 11, the program instructions further comprising:
program instructions to determine a rank for at least one of the cloud service marketplaces in the list of matching cloud service marketplaces, wherein the rank is based, at least in part, on the search criteria.

14. The computer program product of claim 8, the program instructions further comprising:
program instructions to generate a report for a published cloud service, wherein the report includes at least one or more of the following: (i) payment details of one or more subscribers to the published cloud service; (ii) one or more provisioning requests for subscribers to the published cloud service; (iii) one or more de-provisioning requests for subscribers canceling a subscription to the published cloud service; (iv) user ratings of the published cloud service; or (v) billing reports from one or more cloud service marketplaces.

15. A computer system comprising:
one or more computer processors;
one or more computer readable storage media; and
program instructions stored on the computer readable storage media for execution by at least one of the one or more processors, the program instructions comprising:
program instructions to identify a cloud service offered by a service provider;
program instructions to determine at least one feature of the cloud service;
program instructions to generate a cloud service template for the cloud service based, at least in part, on a taxonomy of the cloud service;
program instructions to determine a first categorization of the cloud service based, at least in part, on the at least one feature;
program instructions to determine a plurality of recommended cloud marketplaces based, at least in part, on a comparison of the cloud service template to one or more respective features of a plurality of cloud marketplaces;
program instructions to generate a plurality of publication templates for the cloud service to the plurality of recommended clouds marketplaces based, at least in part, on (i) the cloud service template and (ii) one or more publishing requirements of the respective plurality of recommended cloud marketplaces; and
program instructions to publish the cloud service to a plurality of cloud marketplaces based, at least in part, on a respective publication template associated with a respective cloud marketplace of the plurality of cloud marketplaces.

16. The computer system of claim 15, the program instructions further comprising:
program instructions to receive a search criteria; and
program instructions to generate a list of matching cloud service marketplaces based, at least in part, on the search criteria.

17. The computer system of claim 16, wherein the search criteria includes one or more of the following: (i) a rating or reputation of the cloud service marketplaces; (ii) commissions charged by the cloud service marketplaces; (iii) licensing requirements of the cloud service marketplaces; (iv) payment or collections methods of the cloud service marketplaces; (v) group license discounts; or (vi) sales or other seasonal discounts.

18. The computer system of claim 16, wherein the search criteria includes one or more of the following: (i) a distribution of currently published services of the cloud service marketplaces; or (ii) a popularity of the currently published services of the cloud service marketplaces; or (iii) an amount of current subscribers for the currently published services of the cloud service marketplaces.

19. The computer system of claim 18, wherein the search criteria is further based, at least in part, on the first categorization of the cloud service.

20. The computer system of claim 18, the program instructions further comprising:
   program instructions to determine a rank for at least one of the cloud service marketplaces in the list of matching cloud service marketplaces, wherein the rank is based, at least in part, on the search criteria.

* * * * *